(12) United States Patent
Li et al.

(10) Patent No.: US 8,093,915 B2
(45) Date of Patent: Jan. 10, 2012

(54) ANGLE-MEASURING DEVICE WITH AN ABSOLUTE-TYPE DISK CAPACITIVE SENSOR

(75) Inventors: Guangjin Li, Guilin (CN); Jian Shi, Guilin (CN)

(73) Assignee: Guilin Gemred Sensor Technology Ltd., Guilin (CN)

( * ) Notice: Subject to any disclaimer, the term of this patent is extended or adjusted under 35 U.S.C. 154(b) by 447 days.

(21) Appl. No.: 12/252,247

(22) Filed: Oct. 15, 2008

(65) Prior Publication Data

US 2009/0134886 A1    May 28, 2009

(30) Foreign Application Priority Data

Nov. 26, 2007    (CN) .......................... 2007 1 0050658

(51) Int. Cl.
*G01R 27/26* (2006.01)
(52) U.S. Cl. ...................................................... 324/686
(58) Field of Classification Search .................. 324/686
See application file for complete search history.

(56) References Cited

U.S. PATENT DOCUMENTS

| | | | |
|---|---|---|---|
| 4,638,249 A * | 1/1987 | Tanaka et al. ................. | 324/166 |
| 5,736,865 A * | 4/1998 | Nelson et al. ................. | 324/660 |
| 6,170,162 B1 * | 1/2001 | Jacobsen et al. .............. | 33/1 PT |
| 6,199,292 B1 * | 3/2001 | Ebeling ........................... | 33/775 |
| 6,788,220 B2 * | 9/2004 | Netzer ..................... | 340/870.37 |

* cited by examiner

*Primary Examiner* — Jeff Natalini
(74) *Attorney, Agent, or Firm* — Matthias Scholl P.C.; Matthias Scholl

(57) ABSTRACT

An absolute position measuring device suitable for wide-angle range measurement and providing the advantages of high precision, high resolution, and easy data processing. The measuring device comprises a disk capacitive sensor, a measurement signal processing unit, a data processing unit, and a display unit. The disk capacitive sensor comprises a rough division sensor and a fine division sensor. The pitch point value of the fine division sensor is at least two times higher than two resolutions of the rough division sensor. The rough division sensor and the fine division sensor have the same zero position. The grids of the two rough division and fine division sensors are independent to each other, are free of electric coherence, and are fixed relatively to each other. The grid has an exclusive absolute displacement value within a single pitch measurement range.

6 Claims, 5 Drawing Sheets

ANGLE-MEASURING DEVICE WITH AN ABSOLUTE-TYPE DISK CAPACITIVE SENSOR

CROSS-REFERENCE TO RELATED APPLICATIONS

Pursuant to 35 U.S.C. §119 and the Paris Convention Treaty, this application claims the benefit of Chinese Patent Application No. 200710050658.3 filed Nov. 26, 2006, the contents of which are incorporated herein by reference.

BACKGROUND OF THE INVENTION

1. Field of the Invention

The invention relates to an angle measuring device, and more specifically, to an absolute-type disk capacitive sensor measuring device for absolute angular position measurement.

2. Description of the Related Art

Conventional capacitive-type measuring devices for angular position measurement adopt variable-area capacitive sensors. By detecting the capacitance change of a movable pole piece relative to a fixed pole piece, angle variation can be measured. Conventional capacitive measuring devices include two types: incremental and absolute. Owing to the limitation on the capacitance amount, conventional absolute-type capacitive measuring devices can only be used to measure absolute small angle position, and thus their application is limited. Wide-angle measurements can be realized using incremental-type capacitive sensors by continuously reading a periodically-alternating phase signal of a grid coupling.

However, incremental-type capacitive sensors have the following drawbacks:

a) The periodically-alternating phase signal is read continuously, and the device is always calculating. If the movable member moves relatively fast, the phase signal will also change at a high speed, and the calculating response speed must be increased to match the phase signal change frequency.

b) To calibrate a measurement, the movable member must be re-zeroed. Calculation errors propagate and multiply.

c) If the power is turned off, the reference position of the movable member must be reset before further use.

To overcome the drawbacks of the incremental-type capacitive sensors, a measuring device for absolute position measurement is disclosed, e.g., in U.S. Pat. No. 4,420,754, and China Pat. Nos. CN89106051, CN93107991, and CN93117701. This measuring device realizes measurement of absolute position displacement by detecting multiple different periodic phase signals generated by the movement of movable members. However, the multiple different periodic phase signals are highly correlated and are all based on the measuring phase difference between a rough division signal and a fine division signal. In addition, the process of calculating the fine phase signal within the rough phase signal periodicity is required in order to calculate the absolute position. The phase signal can then be integrated by applying logical operation suitable for different periodic phase signals, and combining with complicated operation procedure, and measuring each phase periodicity. However, it is complicated to apply synchronous modulation control for calculating the counting pulse according to demand. In order to increase the measurement precision, three different signal patterns, rough pattern, medium pattern, and fine pattern, can be used. With this method, the data processing process is complicated, and the data display frequency can not always match the fast movement steps of the movable members. If higher data processing speed is required, the size of the data processing device must be increased. Therefore, the conventional method cannot be applied in a manual-type measuring device.

China Pat. No. CN03103875 discloses another absolute position measuring device with two sets of rotary encoders rotating relative to each other. The absolute position of the movable member is calculated according to the phase difference between different phase signals. However, owing to the too high requirement on the grid position and the complexity of the signal processing circuit or the device structure, the device cannot be manufactured economically and reliably and thus, does not have a wide applicability.

SUMMARY OF THE INVENTION

Therefore, it is one objective of this invention to provide an absolute position measuring device suitable for wide-angle range measurement and providing the advantages of high precision, high resolution, and easy data processing.

In order to realize the above objective, provided an absolute disk capacitive sensor measuring device for absolute position measurement established based on the conventional incremental capacitive sensor and adopting disk capacitive grid technology combining with microprocessor processing technique for angle measurement. The measuring device comprises a disk capacitive sensor, a measurement signal processing unit, a data processing unit, and a display unit. The disk capacitive sensor comprises a rough division sensor and a fine division sensor, wherein the pitch point value of the fine division sensor is two times higher than the resolution of the rough division sensor, and the rough division sensor and the fine division sensor have the same zero position. The grids of the two rough division and fine division sensors are independent to each other, are free of electric coherence, and are fixed relatively to each other. The grid has an exclusive absolute displacement value within a single pitch measurement range.

In a class of this embodiment or in another embodiment of the invention, the disk capacitive sensor has a reflection 2-piece structure comprising a fixed grid piece and a movable grid piece. A rough division emitting pole and a receiving pole corresponding to the rough division sensor and a fine division emitting pole and a receiving pole corresponding to the fine division sensor are concentrically installed on the same fixed grid piece. A rough division reflecting pole, a fine division reflecting pole, and a shielding pole are installed at the projection position on the movable grid piece corresponding to the positions of the emitting pole and the receiving pole.

In a class of this embodiment or in another embodiment of the invention, optionally, the disk capacitive sensor has a transmission 3-piece structure comprising an emitting plate, a receiving plate, and a shielding plate. A rough division emitting pole corresponding to the rough division sensor and a fine division emitting pole corresponding to the fine division sensor are installed on the emitting plate. A rough division receiving loop and a fine division receiving loop are located at the projection position on the receiving plate corresponding to the emitting pole. A transmission window corresponding to the rough division emitting pole and the fine division emitting pole is opened on the shielding plate.

In a class of this embodiment or in another embodiment of the invention, the capacitive grid integrated circuit of the measurement signal processing unit comprises a rough division signal processing circuit and a fine division signal processing circuit.

In a class of this embodiment or in another embodiment of the invention, optionally, a switching circuit capable of selectively connecting to the rough division receiving signal and the fine division receiving signal and sending the signal to the capacitive grid integrated circuit of the measurement signal processing unit is installed between the capacitive grid integrated circuit and the disk capacitive sensor of the measurement signal processing circuit.

In a class of this embodiment or in another embodiment of the invention, the data processing unit comprises a microprocessor comprising an I/O port, a RAM, a ROM, and a CPU. The microprocessor serves to read only the displacement data in the single pitch of the rough division and fine division sensors output from the capacitive grid integrated circuit, and to add or subtract the pulse equivalent amount to ensure compulsorily the accuracy of integrating the absolute position data of the rough division and fine division sensors.

In a class of this embodiment or in another embodiment of the invention, the measuring device further comprises an apparatus serving to count the rotation turns and to send the count data to the data processing unit.

In a class of this embodiment or in another embodiment of the invention, the measuring device is established based on the incremental capacitive sensor and adopts disk capacitive grid technology combining with microprocessor processing technique for angle measurement. Within the measurement range of a whole circumference of 360°, the measuring device comprises a rough division sensor and a fine division sensor. According to the principle of capacitive grid, the output signal value is one-to-one correspondent to the capacitive grid position within a pitch. To a whole circumference of 360°, the rough division sensor is set with one pitch and thus has a fixed value, while the pitch quantity of the fine division sensor can be set according to demand. Theoretically, the pitch quantity of the fine division sensor is larger than one resolution of the rough division pitch. However, taking the manufacturing and assembly errors into consideration, and to ensure the reliable and stable operation of the absolute disk capacitive sensor, the fine division pitch quantity is normally set to be more than ten times higher than that of the rough division pitch.

For example, within a whole circumference of 360°, the rough division sensor is set with one pitch, and the fine division sensor is set with 18 pitches. This is to say that the pitch value of the rough division sensor is 360° while the pitch value of the fine division sensor is 20°. The pulse equivalent amount of one pitch is set with 512 decimal numbers. Namely, each pulse equivalent amount of the rough division data is equivalent to $(360/1)/512 \approx 0.7$ degrees, and that of the fine division data is equivalent to $(360/18)/512 \approx 0.04$ degrees. Therefore, different resolutions can be obtained by selecting different pitch quantity for the fine division sensor. From a practical standpoint, a resolution of 0.01 degrees can be obtained economically.

When measuring, the absolute position data of the whole circumference of 360° can be obtained by measuring the pitch of the independent rough division sensor and that of the fine division sensor respectively, integrating the rough division data and the fine division data through microprocessors, and then eliminating the errors. For example, a digit higher than tens is rounded according to the rough division sensor data, while a digit lower than tens is chose according to the fine division sensor data.

For the number at the carry-in point, to eliminate the influence of sensor error, the fine division sensor data is read first, and then the detected rough division sensor data is processed by adding or subtracting a certain number of pulse equivalent amount according to the situation that the data is prior to carrying in or is after carried in, so as to ensure compulsorily that the data carrying-in is accurate and to eliminate the influence of the rough division and fine division sensor errors on data integration. For a measurement range larger than one circumference (360 degrees), an apparatus for counting the number of rotation turns is added. The absolute position measurement then can be realized by sending the counted number of rotation turns to the microprocessor for data integration.

In a class of this embodiment or in another embodiment of the invention, the absolute position measurement for wide angle range is realized by applying microprocessor to integrate the detected single pitch data of multiple (more than two) incremental disk capacitive sensors after the error is eliminated. The characteristics of high precision and high resolution of the incremental disk capacitive sensor is inherited and promoted. Moreover, based on the feature that the data in a single pitch of the capacitive sensor is only related to its position, the single pitch data read at any time is exclusive to its position, so that the drawbacks of the conventional incremental sensor, such as the detecting speed, the continuous detection requirement, and so on, are avoided.

In a class of this embodiment or in another embodiment of the invention, the grids of the two incremental capacitive sensors are independent to each other, free of electric coherence, and can be operated separately. The existing mature measuring circuit and processing technology can be applied to the measuring device of the invention instead of requiring special circuit and technology to avoid the too high requirement on grid position and the complexity of signal processing integrated circuit.

In a class of this embodiment or in another embodiment of the invention, the grids of the two incremental capacitive sensors can share the same driving signal, the same measuring circuit, and the same processing circuit by adopting switching circuit time-sharing processing technique. Therefore, the absolute position measurement can be realized by using an existing normal incremental capacitive signal processing integrated circuit combining with a microprocessor. It is helpful to keep the signal synchrony of the microprocessor and to avoid integration error, and to develop the technical advantage of the existing mature incremental capacitive sensor, and thus to reduce development cost and development cycle.

In a class of this embodiment or in another embodiment of the invention, the grid of the capacitive sensor has a transmission type structure, the pole pieces of the two rough division and fine division capacitive grids are concentric and are fixed invariantly to each other on the same plate. The size of the device can be reduced and thus the device is suitable for application in small areas. Besides, the influence of assembly error can be avoided and the requirement on processing precision can be decreased.

In a class of this embodiment or in another embodiment of the invention, the microprocessor is applied to integrate the single pitch data of more than two incremental disk capacitive sensors after the error is eliminated, and the flexibility of the microprocessor in data program processing can be brought into full play. Only simple programmable processing is needed to eliminate the influence of the errors of the two incremental sensors on data integration. The high complexity and uncertainty of some existing technology adopting hardware processing is avoided, and the product development cycle is expedited.

BRIEF DESCRIPTION OF THE DRAWINGS

The invention is described hereinbelow with reference to accompanying drawings, in which.

DETAILED DESCRIPTION OF THE EMBODIMENTS

The present invention will hereinafter be described further according to the embodiments.

Figure 1:
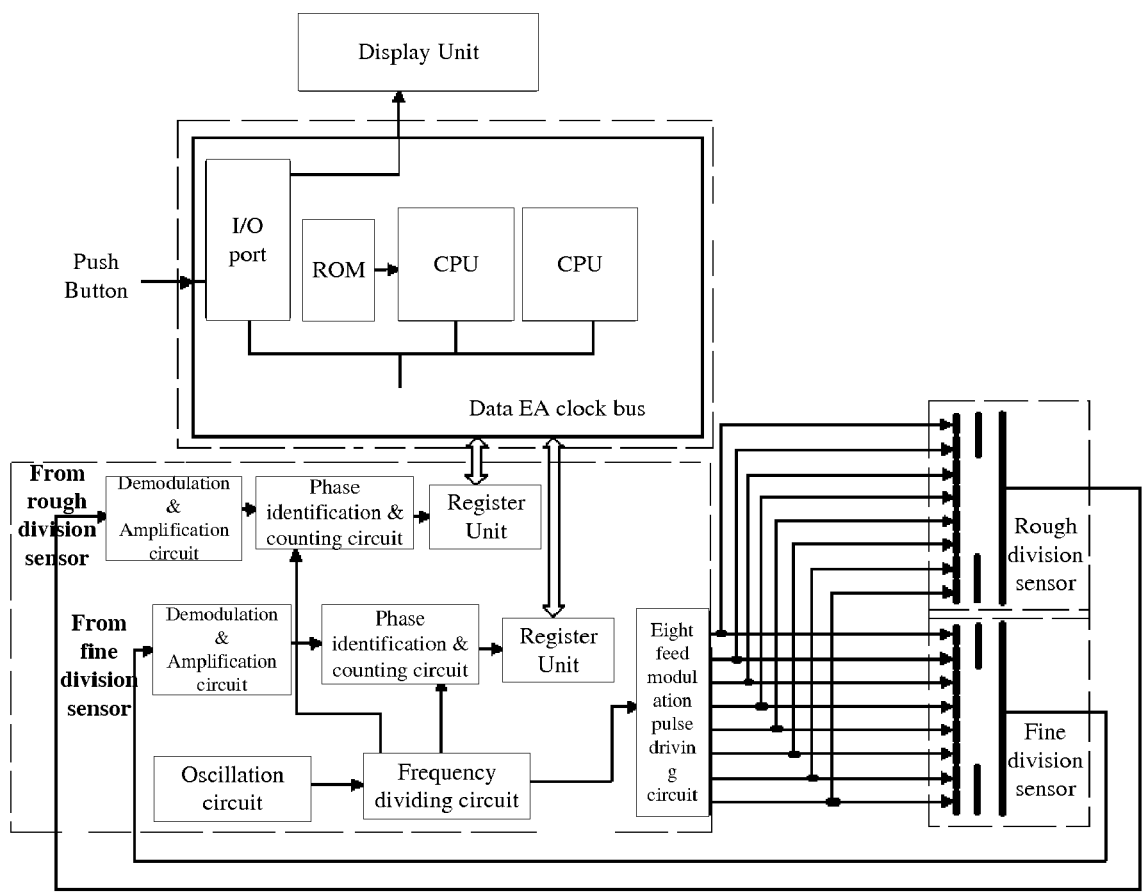
FIG. 1 is a circuit block diagram in accordance with one embodiment of the invention.
Figure 2:
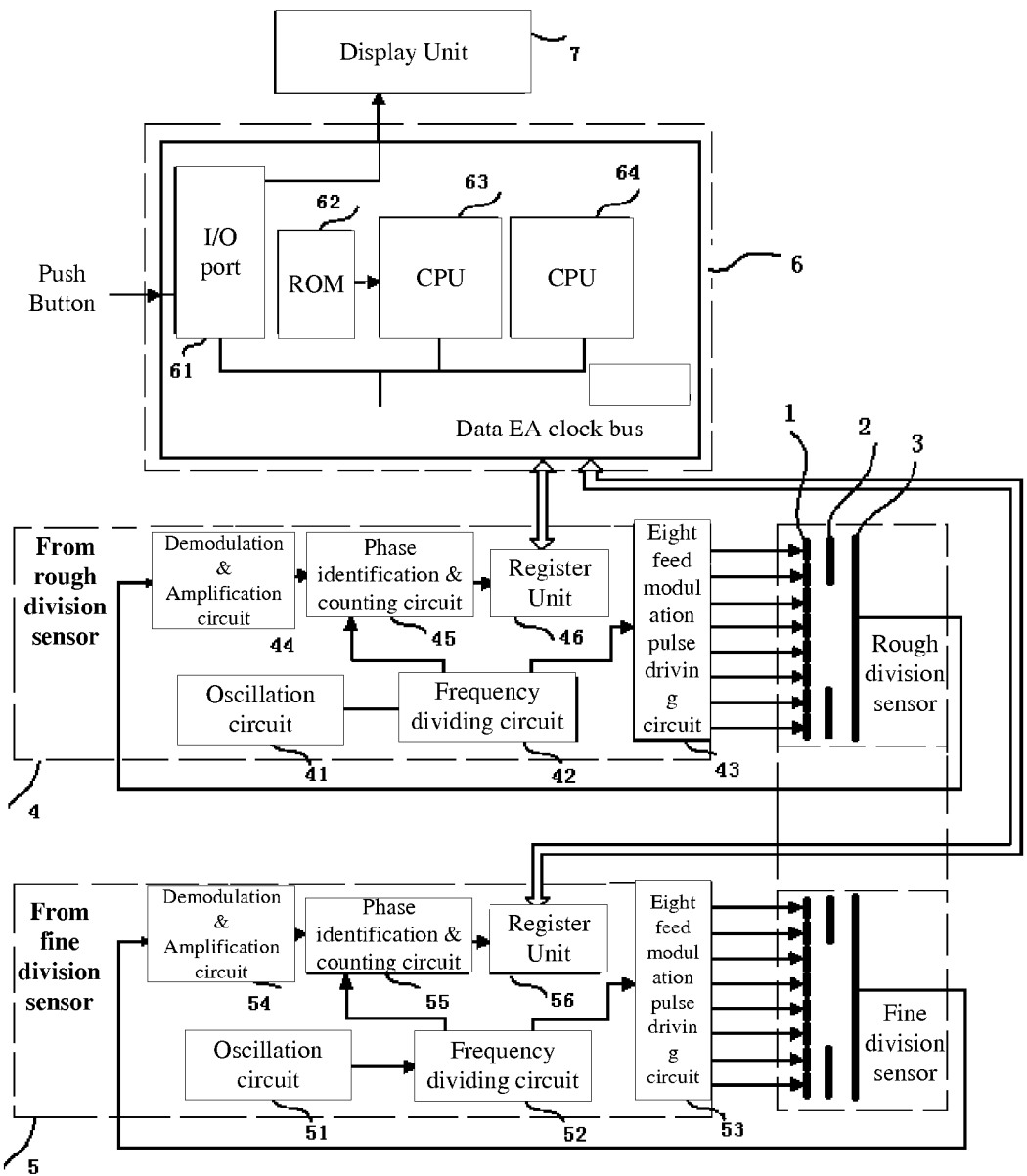
FIG. 2 is a circuit block diagram in accordance with another embodiment of the invention.
Figure 3:
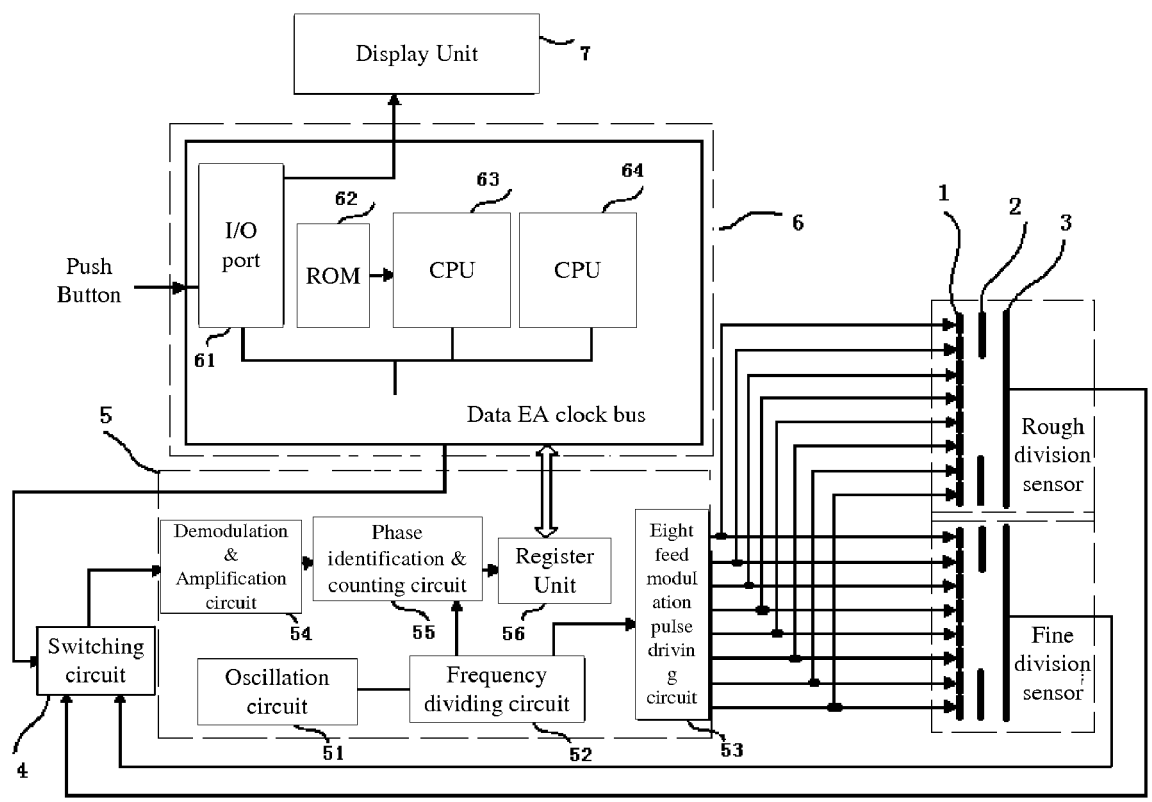
FIG. 3 is a circuit block diagram with a switching circuit in accordance with another embodiment of the invention.
Figure 4:
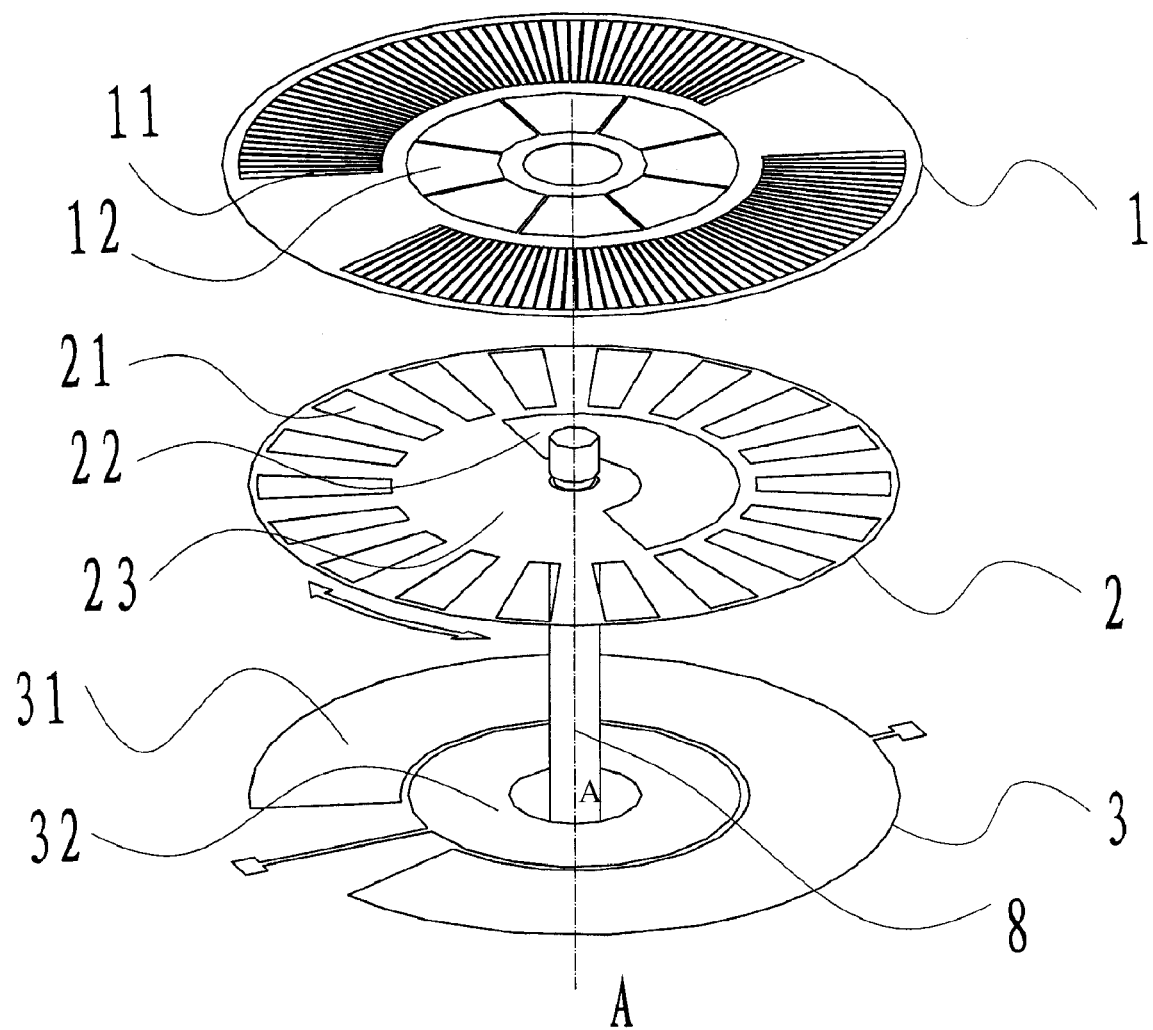
FIG. 4 is a transmission 3-piece absolute disk capacitive sensor in accordance with one embodiment of the invention.
Figure 5:
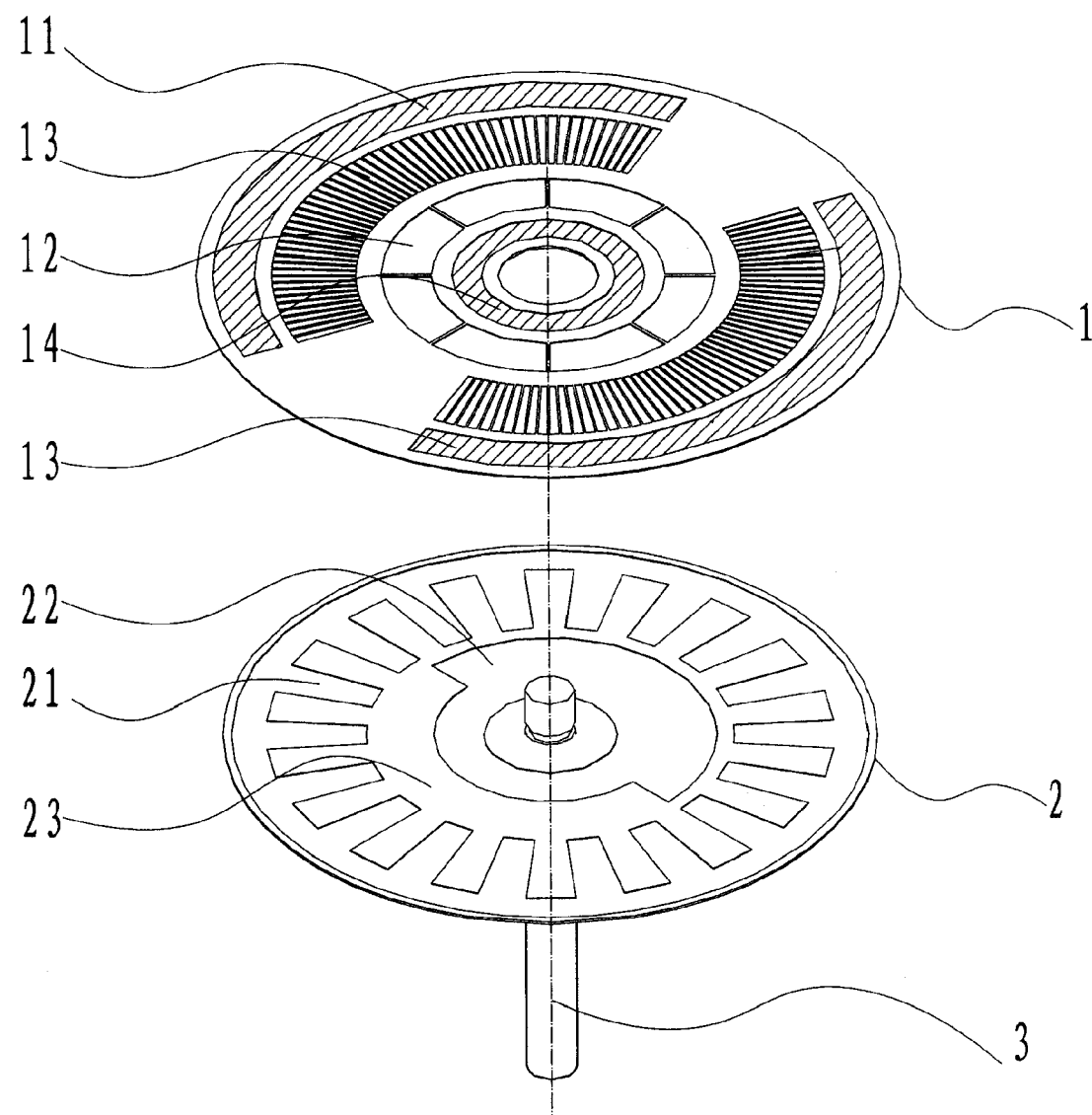
FIG. 5 is a reflection 2-piece type absolute disk capacitive sensor in accordance with one embodiment of the invention.

As shown in FIGS. 3-4, the measuring device of the invention comprises a sensor unit comprising an emitting plate 1, a shielding plate 2, and a receiving plate 3; a signal processing unit comprising a switching circuit 4 and a capacitive grid integrated circuit 5; a data processing unit 6; a display unit 7; and a rotating shaft 8.

Two emitting grid poles: a fine-division emitting pole 11 and a rough-division emitting pole 12 are concentrically designed on the emitting plate. The fine division emitting pole 11 is divided uniformly into eighteen sets according to the eighteen pitches on the circumference, each set contains eight driving pole pieces, and the segment angle of each set of the emitting pole is 20 degrees. To facilitate the printed circuit board (PCB) wiring, fourteen sets of the total eighteen sets are symmetrically selected. The rough division emitting pole 12 is divided as one set according to the one pitch on the circumference, and that set contains eight driving pole pieces. Namely, the eight driving pole pieces of the rough division emitting pole 12 and the fine division emitting pole 11 are divided uniformly as one set. The angle of the set is 360 degrees.

Each set of the rough division and fine division emitting poles is electrically connected with the eight feeds driving signal output from the eight feeds modulation pulse driving circuit 53 of the capacitive signal processing integrated circuit 5, respectively. At least one emitting pole piece of the rough division emitting pole and that of the fine division emitting pole share the same starting point on the circumference, and the driving signal is synchronous. A fine division receiving loop 31 and a rough division receiving loop 32 are set at the projection position on the receiving plate 3 corresponding to the emitting plate, and form capacitive coupling with the fine division emitting pole and the rough division emitting pole, respectively, on the emitting plate to form a grid capacitor. A pin protruding out of the capacitor serves to send the received modulation signal to the two signal input ports of the switching circuit 4.

A transmission window 21 and a transmission window 22 are opened on the shielding plate 2. The transmission window 21 is opened according to eighteen pitches and thus is correspondent to the fine division emitting pole, while the transmission window 22 is opened according to one pitch and is thus correspondent to the rough division emitting pole. Besides, a shielding pole 23 is disposed on the shielding plate 2 and is grounded. The electric signal of the emitting pole can only be coupled with the receiving pole via the transmission windows. The shielding plate 2 is fixedly-connected to the rotating shaft 8 and can rotate around its center point driven by the rotating shaft 8.

The projection area of the emitting pole through the transmission window can be changed with the rotation of the shielding plate 2, and thus the electric signal to the receiving plate changes synchronously. Namely, fine modulation signal related to the rotation angle of the rotating shaft can be obtained on the receiving pole 31 of the receiving plate by the eight feeds modulation pulse driving signals passing through the fine division emitting pole 11 of the emitting plate 1 and the transmission window 21 of the shielding plate 2. Rough modulation signal related to the rotation angle of the rotating shaft can be obtained on the receiving pole 32 of the receiving plate by the eight feeds modulation pulse driving signals passing through the rough division emitting pole 12 of the emitting plate 1 and the transmission window 22 of the shielding plate 2.

Controlled by a microprocessor, the switching circuit 4 can selectively connect to the receiving pole signal of the rough division sensor or that of the fine division sensor and can send the signal to the input pole of the capacitive grid integrated circuit 5 of the measurement signal processing unit, so as to ensure that the selected signal data is processed correctly within each reading period of the microprocessor.

The capacitive grid integrated circuit 5 of the measurement signal processing unit adopts the signal measurement technology of the conventional capacitive integrated circuit, comprising an oscillation circuit 51, a frequency dividing circuit 52, an eight feeds modulation pulse driving circuit 53, a demodulation and amplification circuit 54, a phase identification and calculating circuit 55, a register 56, and so on. Each pitch period can generate 512 pulse equivalents.

The microprocessor of the data processing unit 6 comprises an I/O port serving to receive interrupt signal and send it to the central processing unit (CPU) 63, and to transfer the signal data processed by the CPU to the display circuit 7 to drive the LCD display. The microprocessor reads the output data from the capacitive grid integrated circuit 5 in a three-wire asynchronous sampling form to generate an EA request signal according to program requirements. Meanwhile, the EA request signal is connected to the control port of the switching circuit 4, so that the integrated circuit 5 of the measurement signal processing unit can process the selected rough or fine division sensor signal data according to demand.

According to the read-in fine division and rough division binary data, the CPU 63 takes a low data not more than one pitch. Normally, the pulse equivalent amount in one pitch is not more than 512 decimal numbers. Namely, each pulse equivalent amount of the rough division data is equivalent to 360/512≈0.7 degrees, and that of the fine division data is equivalent to 360/18/512≈0.04 degrees.

In order to facilitate the integration of rough division data and the fine division data, the rough division data selects integral multiples of ten degrees as data source of tens and more (the integrated degree of angle is defined as zero pulse equivalent when the pulse equivalent amount is in a range of between 0 and 14, which equals that the tens of the rough division data is 1. The integrated degree of angle is defined as fifteen pulse equivalents when the pulse equivalent amount is in a range of between 15 and 28, which equals that the tens of the rough division data is 1; and so on. The fine division data selects pulse equivalent amount of not more than 10 degrees as data source of units or less.

The rotation angle measurement of the rotating shaft is realized via the steps of: integrating the rough division data and the fine division data together to obtain an absolute position pulse equivalent amount within the entire circumference; subtracting the integrated data by the absolute pulse equivalent amount set at the reference zero point (the data can be read during zero clearing and can be stored in RAM64); converting the pulse equivalents into degrees and decimals; and sending the processed data to an LCD for displaying.

Owing to manufacturing errors of the rough division sensor and the fine division sensor, a large error in measurement may occur when reading data at the carry-in point. To eliminate sensor errors, the fine division sensor data is read first, and then data detected from the rough division sensor is processed by adding or subtracting a certain number of pulse equivalent amount according to the situation that the data is prior to carrying in or is after being carried in, so as to ensure that the data carrying-in is accurate and to eliminate the influence of the rough division and fine division sensor errors on data integration.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

The invention claimed is:

1. A device for absolute position measurement, comprising:
   a disk capacitive sensor,
   a signal processing unit,
   a data processing unit, and
   a display unit,
   wherein
   said disk capacitive sensor comprises a rough division sensor and a fine division sensor each having a pitch value;
   the pitch value of said rough division sensor is at least two times higher than that of said fine division sensor;
   said rough division sensor and said fine division sensor have the same zero position;
   grids of said rough division sensor and said fine division sensor are independent of each other, are free of electric coherence, and are fixed relatively to each other;
   the grids each have an exclusive absolute displacement value within a single pitch measurement range;
   said disk capacitive sensor has a transmission 3-piece structure comprising an emitting plate, a receiving plate, and a shielding plate;
   a rough division emitting pole corresponding to said rough division sensor, and a fine division emitting pole corresponding to said fine division sensor are installed on said emitting plate;
   a rough division receiving loop and a fine division receiving loop are disposed at a projection position on said receiving plate corresponding to said emitting pole; and
   a transmission window corresponding to said rough division emitting pole and said fine division emitting pole is opened on said shielding plate.

2. The device of claim 1, wherein a capacitive grid integrated circuit of said signal processing unit comprises a rough division signal processing circuit and a fine division signal processing circuit.

3. The device of claim 1, wherein a switching circuit capable of selectively connecting to a rough division receiving signal and a fine division receiving signal and sending the signal to a capacitive grid integrated circuit of said signal processing unit is installed between said capacitive grid integrated circuit and said disk capacitive sensor.

4. The device of claim 1, wherein
   said data processing unit comprises a microprocessor having an I/O port, a RAM, a ROM, and a CPU; and
   said microprocessor serves to read only absolute displacement data in the single pitch of said rough division and fine division sensors output from said capacitive grid integrated circuit, and calculate pulse equivalent to ensure accuracy of integrating the absolute displacement data of said rough division and fine division sensors.

5. The device of claim 1, wherein said measuring device further comprises an apparatus serving to count the rotation turns and to send the count data to said data processing unit.

6. The device of claim 1, wherein said disk capacitive sensor comprises further an axis of rotation (A), and said rough division sensor is located closer to said axis of rotation than said fine division sensor.

* * * * *